(12) United States Patent
Wright (10) Patent No.: US 10,891,007 B2
(45) Date of Patent: *Jan. 12, 2021

(54) METHOD AND APPARATUS FOR DATA TRANSMISSION VIA CAPACITANCE SENSING DEVICE

(71) Applicant: Cypress Semiconductor Corporation, San Jose, CA (US)

(72) Inventor: David G. Wright, San Mateo, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/870,516

(22) Filed: Jan. 12, 2018

(65) Prior Publication Data

US 2018/0188854 A1 Jul. 5, 2018

Related U.S. Application Data

(63) Continuation of application No. 14/609,274, filed on Jan. 29, 2015, now Pat. No. 9,891,765, which is a continuation of application No. 13/435,890, filed on Mar. 30, 2012, now Pat. No. 9,013,425.

(60) Provisional application No. 61/602,480, filed on Feb. 23, 2012.

(51) Int. Cl.
*G06F 3/044* (2006.01)
*H04B 5/00* (2006.01)
*G06Q 20/36* (2012.01)
*H04M 1/725* (2006.01)

(52) U.S. Cl.
CPC ......... *G06F 3/044* (2013.01); *G06Q 20/3674* (2013.01); *H04B 5/0012* (2013.01); *H04B 5/0043* (2013.01); *H04M 1/72519* (2013.01)

(58) Field of Classification Search
CPC ...... G06F 3/044; H04B 5/0012; H04B 5/0043
USPC ......... 345/156–184; 455/41.1; 324/658, 679, 324/686; 178/18.01–18.06
See application file for complete search history.

(56) References Cited

U.S. PATENT DOCUMENTS

| | | |
|---|---|---|
| 5,225,959 A | 7/1993 | Stearns |
| 5,463,388 A | 10/1995 | Boie et al. |
| 5,488,204 A | 1/1996 | Mead et al. |
| 5,841,078 A | 11/1998 | Miller et al. |
| 6,002,389 A | 12/1999 | Kasser |
| 7,671,837 B2 | 3/2010 | Forsblad et al. |
| 8,199,126 B1 | 6/2012 | Taubman |
| 8,200,582 B1 | 6/2012 | Zhu |

(Continued)

OTHER PUBLICATIONS

U.S. Appl. No. 14/609,274: "Method and Apparatus for Data Transmission via Capacitance Sensing Device" Thomas Fuller et al., filed Jan. 29, 2015; 38 pages.

(Continued)

*Primary Examiner* — Prabodh M Dharia (57) ABSTRACT

Example systems and methods transfer data between a first device and a second device. Embodiments generate, using an output circuit, an analog signal based on a data signal for an application associated with the first device and the second device. Embodiments transmit the data signal over an interface between a processor of the first device and a processor of the second device by capacitively coupling the analog signal through a capacitor formed by at least one sensor electrode, of a touchscreen, of the first device and a conductor of the second device.

20 Claims, 7 Drawing Sheets

(56) References Cited

U.S. PATENT DOCUMENTS

| | | |
|---|---|---|
| 8,525,799 B1 | 9/2013 | Grivna et al. |
| 8,624,847 B2 | 1/2014 | Ely |
| 8,823,399 B1 | 9/2014 | Bharathan |
| 9,104,271 B1* | 8/2015 | Adams .................. G06F 3/0426 |
| 10,126,340 B2* | 11/2018 | Simmons ............. H03K 17/962 |
| 2004/0176141 A1* | 9/2004 | Christensen ........... G08C 23/04 |
| | | 455/566 |
| 2004/0178997 A1 | 9/2004 | Gillespie et al. |
| 2005/0023656 A1* | 2/2005 | Leedy ................ B81C 1/00238 |
| | | 257/678 |
| 2005/0126831 A1 | 6/2005 | Richter et al. |
| 2005/0206530 A1* | 9/2005 | Cumming .............. G01D 4/006 |
| | | 340/870.02 |
| 2007/0074914 A1 | 4/2007 | Geaghan et al. |
| 2007/0115263 A1 | 5/2007 | Taylor et al. |
| 2007/0229466 A1 | 10/2007 | Peng et al. |
| 2007/0229469 A1 | 10/2007 | Seguine |
| 2007/0229470 A1 | 10/2007 | Snyder et al. |
| 2008/0024461 A1 | 1/2008 | Richter et al. |
| 2008/0055260 A1 | 3/2008 | Posamentier |
| 2008/0164307 A1 | 7/2008 | Silverstein |
| 2008/0167913 A1 | 7/2008 | Wiswell et al. |
| 2008/0266257 A1 | 10/2008 | Chiang |
| 2009/0191811 A1 | 7/2009 | Griffin et al. |
| 2010/0073454 A1* | 3/2010 | Lovhaugen ........... G06F 3/0486 |
| | | 348/14.03 |
| 2010/0193258 A1 | 8/2010 | Simmons et al. |
| 2010/0214232 A1* | 8/2010 | Chan ...................... G06F 3/044 |
| | | 345/173 |
| 2010/0220900 A1 | 9/2010 | Orsley |
| 2010/0238121 A1 | 9/2010 | Ely |
| 2010/0274902 A1* | 10/2010 | Penman .................. A63F 13/28 |
| | | 709/227 |
| 2010/0283728 A1 | 11/2010 | Hollemans et al. |
| 2010/0292945 A1 | 11/2010 | Reynolds et al. |
| 2010/0328232 A1 | 12/2010 | Wood |
| 2011/0001708 A1 | 1/2011 | Sleeman |
| 2011/0057670 A1 | 3/2011 | Jordan |
| 2011/0063251 A1 | 3/2011 | Geaghan et al. |
| 2011/0120784 A1 | 5/2011 | Osoinach et al. |
| 2011/0156724 A1 | 6/2011 | Bokma et al. |
| 2011/0157030 A1 | 6/2011 | Xu |
| 2011/0181516 A1* | 7/2011 | Mallory ............... A47L 15/4293 |
| | | 345/173 |
| 2011/0187664 A1 | 8/2011 | Rinehart |
| 2011/0267309 A1 | 11/2011 | Hanauer et al. |
| 2011/0270921 A1* | 11/2011 | Jones .................... G06F 3/0421 |
| | | 709/204 |
| 2011/0291944 A1 | 12/2011 | Simmons et al. |
| 2011/0298709 A1* | 12/2011 | Vaganov ............. G06F 3/03546 |
| | | 345/158 |
| 2012/0019478 A1* | 1/2012 | Bulea .................... G06F 3/0416 |
| | | 345/174 |
| 2012/0050231 A1 | 3/2012 | Westhues et al. |
| 2012/0058775 A1 | 3/2012 | Dupray et al. |
| 2012/0109455 A1* | 5/2012 | Newman ............. G06F 3/03547 |
| | | 701/36 |
| 2012/0113047 A1 | 5/2012 | Hanauer |
| 2012/0127110 A1 | 5/2012 | Amm et al. |
| 2012/0158434 A1 | 6/2012 | Reid |
| 2012/0229419 A1 | 9/2012 | Schwartz et al. |
| 2012/0249449 A1 | 10/2012 | Tseng et al. |
| 2012/0293447 A1* | 11/2012 | Heng ...................... G06F 3/044 |
| | | 345/174 |
| 2012/0327040 A1 | 12/2012 | Simon et al. |
| 2013/0009907 A1 | 1/2013 | Rosenberg et al. |
| 2013/0015867 A1 | 1/2013 | Aras et al. |
| 2013/0057513 A1* | 3/2013 | Wu ..................... G02F 1/13338 |
| | | 345/174 |
| 2013/0063342 A1 | 3/2013 | Chen et al. |
| 2013/0147760 A1* | 6/2013 | Lai ......................... G06F 3/044 |
| | | 345/174 |
| 2013/0194223 A1 | 8/2013 | Ward et al. |
| 2013/0222756 A1* | 8/2013 | Van Heugten ............ G02F 1/29 |
| | | 349/200 |
| 2014/0039819 A1* | 2/2014 | Simmons ............. H03K 17/962 |
| | | 702/65 |
| 2014/0203950 A1* | 7/2014 | Zdeblick ............. A61B 5/6803 |
| | | 340/870.07 |
| 2015/0103047 A1 | 4/2015 | Hanauer |
| 2015/0261359 A1* | 9/2015 | Pi ......................... G06F 3/0412 |
| | | 345/174 |
| 2016/0132137 A1 | 5/2016 | Westhues et al. |

OTHER PUBLICATIONS

Hans-Christian Jetter, et al._Facet-Streams: Tangible tabletop search receives Honorable Mention at CHI 2011_Dated 2011_2 pages.
International Search Report for International Application No. PCT/US2012/053226 dated Mar. 12, 2012; 2 pages.
NFC Payments and the Point of Sale_Date May 2011_12 pages.
Sample et al. A Capacitive Touch Interface for Passive RFID Tags.' Dec. 2009. Retrieved on Oct. 24, 2012 (Oct. 24, 2012). Retrieved from the Internet at URL:<https://sensor.cs.washington.edu/pubs/WISP/WISP_Sample2009.pdf>.
Shahram Izadi, et al._Experiences with Building a Thin Form-Factor Touch and Tangible Tabletop_4 pages, 2008.
The Gadget Show Live: UK's First Touchscreen Interactive Tabletop—Epson X-Desk_Dated 2009_5 pages.
USPTO Advisory Action for U.S. Appl. No. 13/435,890 dated Oct. 16, 2014; 5 pages.
USPTO Advisory Action for U.S. Appl. No. 14/609,274 dated Nov. 7, 2016; 8 pages.
USPTO Final Rejection for U.S. Appl. No. 13/435,890 dated Aug. 20, 2014; 34 pages.
USPTO Final Rejection for U.S. Appl. No. 14/609,274 dated Jul. 28, 2017; 7 pages.
USPTO Final Rejection for U.S. Appl. No. 14/609,274 dated Aug. 12, 2016; 25 pages.
USPTO Non Final Rejection for U.S. Appl. No. 14/609,274 dated Feb. 21, 2017; 8 pages.
USPTO Non-Final Rejection for U.S. Appl. No. 13/435,890 dated Jun. 4, 2014; 22 pages.
USPTO Non-Final Rejection for U.S. Appl. No. 14/609,274 dated May 13, 2016; 20 pages.
USPTO Notice of Allowance for U.S. Appl. No. 13/435,890 dated Jan. 5, 2015; 9 pages.
USPTO Notice of Allowance for U.S. Appl. No. 13/435,890 dated Mar. 3, 2015; 9 pages.
USPTO Notice of Allowance for U.S. Appl. No. 13/435,890 dated Nov. 28, 2014; 9 pages.
USPTO Notice of Allowance for U.S. Appl. No. 14/609,274 dated Oct. 11, 2017; 9 pages.
Written Opinion of the International Searching Authority for International Application No. PCT/US2012/053226 dated Dec. 3, 2012; 5 pages.

* cited by examiner

METHOD AND APPARATUS FOR DATA TRANSMISSION VIA CAPACITANCE SENSING DEVICE

RELATED APPLICATION

This application is a continuation of U.S. application Ser. No. 14/609,274, filed on Jan. 29, 2015, which is a continuation of U.S. patent application Ser. No. 13/435,890, filed on Mar. 30, 2012, now U.S. Pat. No. 9,013,425, Issued on Apr. 21, 2015, which claims the priority benefit of U.S. Provisional Application No. 61/602,480, filed Feb. 23, 2012, all of which are incorporated by reference herein in their entirety.

TECHNICAL FIELD

This disclosure relates to the field of touch sensors and, in particular, to capacitive sensors.

BACKGROUND

Recent developments in touch sensors have begun to add processing of signal data to attempt to identify objects. Examples of this include the addition of large object detection, stylus operation, fat finger detection, and grip suppression. However, these methods only identify a generic class of object and can not distinguish between particular objects in the class. For example, a finger can not be distinguished from a metal slug, and all large objects are reported using a single flag, and any associated positional information is typically ignored.

Current touch sensors do allow for general user interaction involving location detection of general objects. However, the user is aware of which particular object is on the screen. When the touch sensor is not capable of identifying the particular object, information that could provide the user a richer user experience is ignored.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Embodiments of the present invention provide methods for a touch sensor, or capacitive sensing device, to identify and interact with a particular real world object. Two methods are disclosed—one using a capacitive profile for identification and the other using the touch sensor array traces for wireless communication.

Various embodiments include a method for touchscreen controller to identify and interact with a particular real world object. Two embodiments include one using a capacitive signature for identification and the second using the touchscreen traces to transmit/receive low bitrate UART serial date.

In one embodiment a touchscreen may identify particular object signatures and thus physical objects may be created with a particular capacitive signature. In addition to identifying the presence and location of an object, the ITO traces of the touchscreen may be used for simple bi-directional serial communications between real-world objects and a touchscreen controller (e.g. see 90 of FIG. 11). Enabling a touchscreen to reliably identify and interact with particular real world objects opens up new user interface options. Examples may include the following: a cell phone to unlock; the code from an RSA security token that may be transmitted directly into a system through the touchscreen; game pieces on a touchscreen gameboard that may react to placement on the gameboard using lights, vibration or other methods of signaling a user of an event.

Various embodiments use a capacitive profile to identify a particular object and may also allow for a particular object to communicate with the touchscreen controller using a UART or other serial protocol coupled into the touchscreen traces. Example applications include the following; authentication, asset tracking, Data Matrix applications, game pieces, such as chess pieces where the play does not necessarily have to be via a touchscreen but may also be implemented using an electronic game board.

In another embodiment there may be two objects, one which could be another touchscreen controller that communicates using a serial protocol over a physical connection via the touchscreen traces. This includes communicating with a touchscreen device by coupling signals from another device, in this embodiment other than a stylus, through the touchscreen.

In some embodiments, the ability of the objects to communicate may allow for a host to create haptics interactions outside the actual frame of the device. For example, a real-world game piece may vibrate when certain game conditions occur, or two devices may synchronize for precision timing of events, or when meeting a new business contact, you may transmit your business card, and get theirs by touching the cell phones together.

It should be noted that sensed profiles and serial communication may apply to any sensing method or conductive material that may be invented in the future. In other embodiments, the profile and communication theory could extend to non-conductive sensing methods. For example, if the sensing method uses images to detect objects, this could be modified using LED's (Light Emitting Diodes) to enable a communication channel between real world objects and the controller.

In general, the capacitive sensor array 22 is operated by providing a signal to one of the columns 28 of column sensor elements 24 (i.e., TX electrodes) while grounding the other column sensor 24. Signals are generated in the row sensor elements 26 (i.e., RX electrodes) by electrical coupling of the driven column sensor elements 24 to the row sensor elements 26. The signal induced in the row sensor elements 26 may change due to the presence of an object (e.g., a finger) on, or near, that portion of the sensor array 22. The signal change in the row sensor elements 26 is indicative of change in the capacitance between the row sensor elements 26 and the driven column sensor elements 24 (i.e., "mutual capacitance"). This process is continuously repeated for each of the columns 28 of column sensor elements 24.

In accordance with one aspect of the present invention, an object (e.g., object 14 in FIG. 1) with a particular capacitive profile, or signature, is placed in proximity to the sensor array 22. The particular layout or design of the capacitive profile is used to, for example, transfer data (or communicate) with the capacitance sensing device 12 (FIG. 1).

Figure 1:
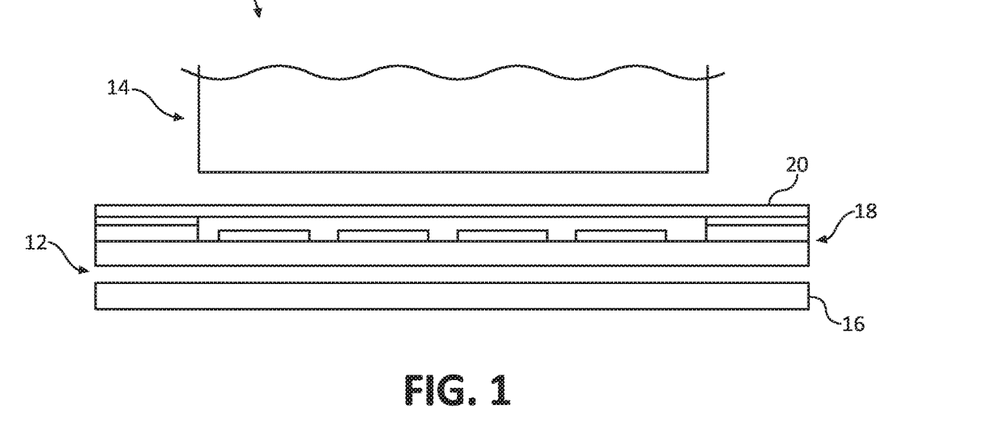
FIG. 1 is a simplified cross-sectional view of the touch sensor device system according to an embodiment.
Figure 3:
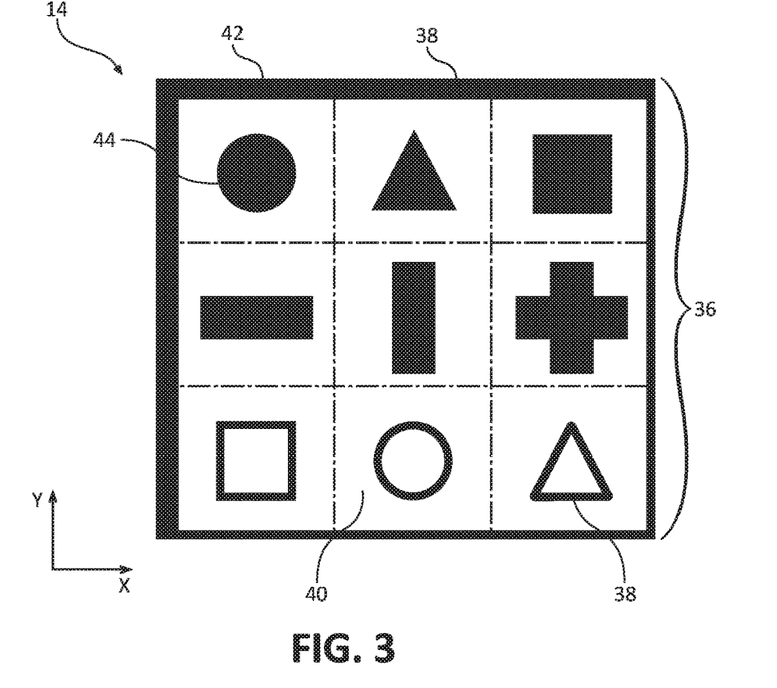
FIG. 3 is a plan view of a capacitive profile of an object according to an embodiment.

FIG. 3 illustrates an exemplary capacitive profile 36 of the object 14 in FIG. 1. The description of the capacitive profile 36 below refers to portions or regions of the object 14 that have relatively high capacitance values and those that have relatively low capacitance values. However, it should be noted that FIG. 3 may also be understood to illustrates the capacitance profile 36 of the object 14 as it is detected by the sensor array 22. That is, FIG. 3 may be understood to illustrate either a side of the object 14 facing the capacitance sensing device 12 and/or an arrangement of signals generated by the sensor array 22 in response to the object 14 being placed proximate to the capacitance sensing device 12 (and/or the sensor array 22).

Still referring to FIG. 3, the capacitive profile 36 includes an arrangement of first (or high) capacitance portions (or regions) 38 and second (or low) capacitance portions 40. In the depicted embodiment, the first capacitance portions 38 include a relative large portion 38a in the shape of an "L" with members extending along the top and left edges (as oriented in FIG. 3) of the capacitive profile 36. Portion 38a is one example of a fiducial element of the capacitive profile 36 which may be used to allow a capacitance sensing device to establish the size and orientation of the profile being sensed.

The first capacitance portions 38 also include smaller portions 38b, which in the depicted embodiment take the form of various geometric shapes and/or symbols. As shown, some of the portions 38b are shaded to indicate a contiguous area with relatively high capacitance values, while others are shown only as outlines of the particular shapes to indicate "hollow" portions of relatively high capacitance values.

As such, the first capacitance portions 38 form various shapes and symbols of relatively high capacitance portions on the object 14, which are separated by lower capacitance portions (second capacitance portions 40). In particular, it should be noted that in various locations within the capacitance profile 36, one of the second capacitance portions 40 is positioned immediately between two of the first capacitance portions 38. This spatial relationship between the first capacitance portions 38 and the second capacitance portions 40 may exist along both the x-axis and the y-axis of the object, as shown by the exemplary orientation of the object 14 in FIG. 3, such that the capacitive profile is two-dimensional (or 2-D). More particularly, in at least some embodiments, at least one of the second capacitance portions 40 is positioned between two of the first capacitance portions 38 along a first axis (e.g., the x-axis), while at least one of the second capacitance portions 40 is positioned between two of the first capacitance portions 38 along a second axis that is perpendicular to the first axis (e.g., the y-axis). It should be noted how such an arrangement differs from the capacitance profile which may be presented by a typical object, such as a finger or stylus, which takes the shape of a single, integral region or signal.

In one embodiment of the invention, the shape, size, orientation and/or location of the shapes relative to each other, or to a fiducial element, may be used to encode data. In one embodiment, a number of bits may be encoded in the shape, size and/or orientation of a set of predefined shapes, and a number of bit fields established relative to fiducials. In the example illustrated in FIG. 3, nine shapes (formed by the first capacitance portions 38b) shown may correspond to nine bit fields of encoded data, and sixteen different shape/orientation combinations possible within a given region may allow four bits of data to be encoded. In such an embodiment, a total of 36 bits may be encoded. As will be apparent one skilled in the art, many alternative fiducial patterns and predetermined shapes, sizes and orientations and/or numbers of regions may be used to encode data.

In one embodiment, the encoded data may be used merely to identify the object placed on or close to the sensor. In another example, the patterns may be used to communicate information to the device incorporating the touch sensor. In a further example, the data encoded may be used to identify the user or the device, acting in place of a password. In another implementation, the data encoded may be used to initiate a particular function or service.

Figure 4:
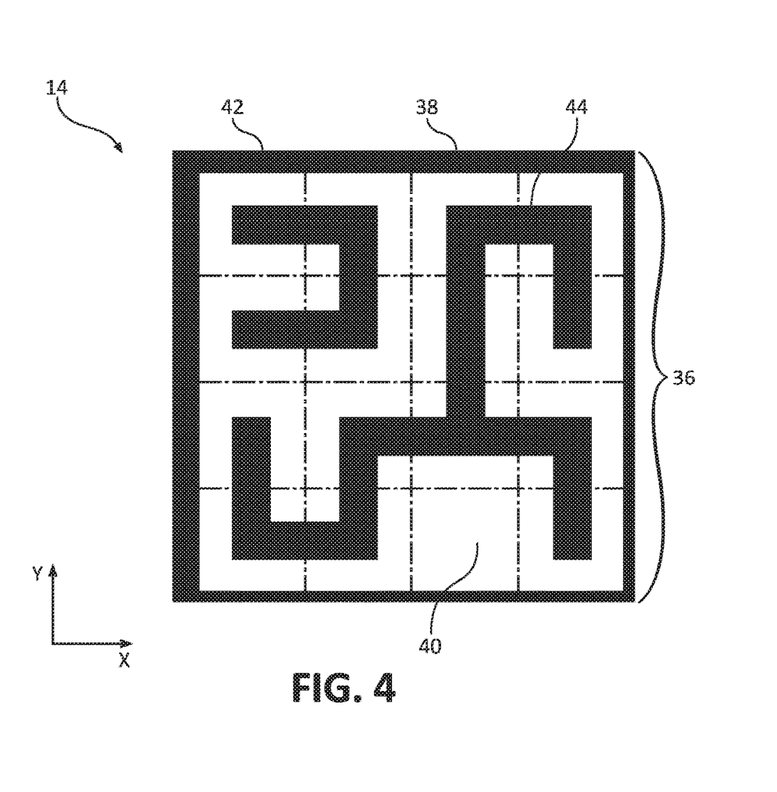
FIG. 4 is a plan view of a capacitive profile of an object according to another embodiment.
Figure 5:
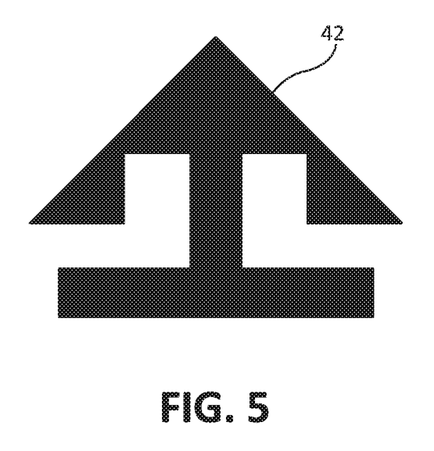
FIGS. 5 and 6 are plan views of high capacitance regions of capacitive profiles according to various embodiments.
Figure 6:
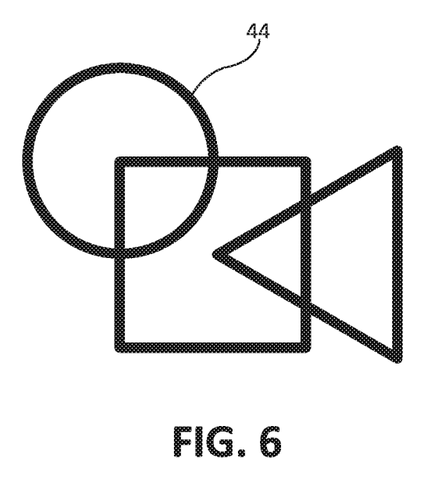

FIG. 4 illustrates a capacitive profile 36 of the object 14 according to another embodiment of the present invention. Of particular interest in FIG. 4 is that the smaller high capacitance portions 38b are arranged to form a pattern of lines, as opposed to the geometric shapes and/or symbols shown in FIG. 3. As in FIG. 3, data may be encoded in the pattern via the presence or absence of a high capacitance link between second capacitance portions 40. In the example illustrated, there are twelve horizontal and twelve vertical boundaries between portions 40, and thus 24 bits of data may be directly encoded in the pattern. FIGS. 5 and 6 illustrate further examples of the high capacitance portions 38b in other shapes and arrangements.

Figure 7:
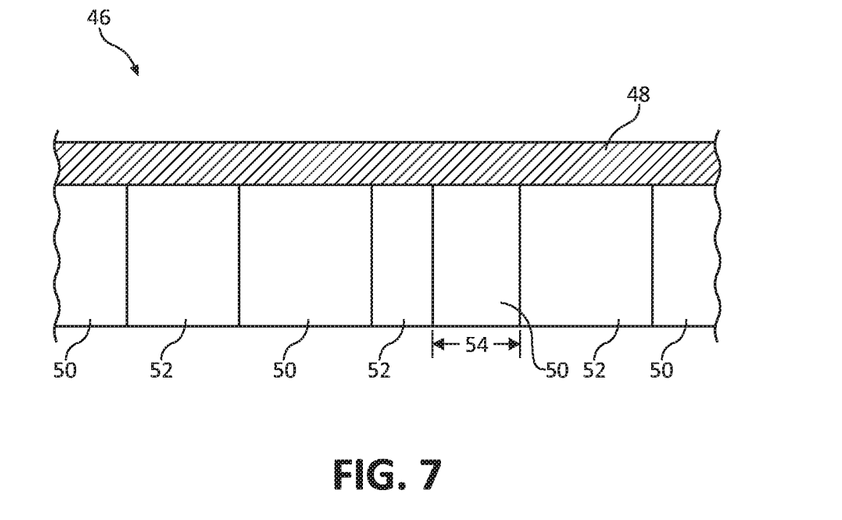
FIG. 7 is a cross-section view of a capacitive structure according to an embodiment.
Figure 8:
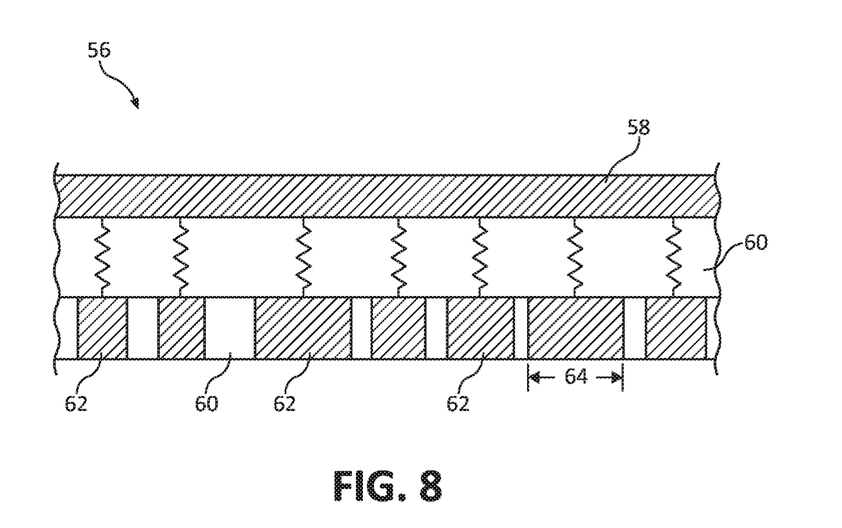
FIG. 8 is a cross-section view of a capacitive structure according to another embodiment.

FIGS. 7 and 8 illustrate cross-sections of structures that may be used to form the capacitive profile(s) 36 described above within the object 14. Referring to FIG. 7, a structure 46 is illustrated that includes a conductive substrate (or layer) (e.g., metal) 48 and an alternating series of high-K bodies 50 and low-K bodies 52 coupled to a lower side of the conductive substrate 48. As will be appreciated by one skilled in the art, the high-K bodies 50 may correspond to the first capacitance portions 38 of the capacitive profiles 36, while the low-K bodies 52 may correspond to the second capacitance portions 40 of the capacitive profiles 36. As such, FIG. 7 (and FIG. 8) may be considered to be cross-sectional views of the object 14 as it is shown in FIG. 1.

It will also be appreciated that the structure 46 may be arranged to form the 2-D capacitive profiles 36 shown in FIGS. 3 and 4, as well as one-dimensional (1-D) and even three-dimensional (3-D) profiles. In an exemplary 3-D profile, the third dimension may correspond to variations in the capacitance values of the first capacitance portions 38 (e.g., the first capacitance portions 38 may include varying degrees of high capacitance portions, such that some of the first capacitance portions 38 have higher capacitance values than others.) It should also be understood that the capacitive profile 36 may be further tuned by adjusting the physical dimensions of the high and low-K bodies 50 and 52, such as the widths 54 thereof.

FIG. 8 illustrates a capacitive structure 56 according to another embodiment. The structure 56 includes a conductive substrate 58, an insulating material 60, and a series of conductive members 62. As shown, the insulating material 60 separates the conductive substrate 58 from the conductive members 62 and separates each of conductive members 62 from the adjacent conductive members 62. As will be appreciated by one skilled in the art, in the embodiment shown in FIG. 8, the conductive members 62 may correspond to the first capacitance portions 38 of the capacitive profiles 36, while the portions of the insulating material 60 between adjacent conductive members 62 may correspond to the second capacitance portions 40 of the capacitive profiles 36. As with the embodiment shown in FIG. 7, the capacitance profile created by the structure 56 shown in FIG. 8 may be altered by adjusting the dimensions, such at the widths 64, of the conductive members 62 (thus altering the resistance applied by each conductive member 62).

It should be noted that the embodiments shown in FIGS. 7 and 8 may each rely on a path to earth ground created by the user holding the metal plate to secure the object in proximity to the capacitance sensing device 12.

In operation, when the object 14 is positioned proximate to the capacitance sensing device 12 (and/or the sensor array 22), the capacitive profile 36 (e.g., as shown in FIG. 3 or FIG. 4) is detected by the sensor array 22 is scanned (e.g., by a processing device or controller). In particular, the particular shapes, symbols, and/or patterns formed by the high capacitance portions 38 (and/or portions 38b) may be detected and recognized (e.g., by a processing device) as being associated with data (which may in turn be associated with the particular object 14). In one embodiment, the data is stored in a look-up stored in a memory within the capacitance sensing device 10. In another embodiment, the data may be encoded in the shapes, symbols, and/or patterns within the capacitive profile 36. In such an embodiment, the data may be decoded within the capacitance sensing device 12 using, for example, an unlock or decryption key (e.g., by a processing device).

As an example of the type of data that could be associated with the object, a capacitance sensing device may identify a particular token object before allowing the phone to unlock. For example, the code from an RSA security token could be transmitted directly into a system through the touchscreen. As another example, game pieces on a touchscreen gameboard could react to placement on the gameboard using lights, vibration or other methods of signaling a user of an event. In another example, the data may be used to assist in pairing devices for wireless communication, such as when pairing Bluetooth devices. However, it may also be applicable to Wi-Fi, ZigBee or other wireless communication networks or systems.

Figure 2:
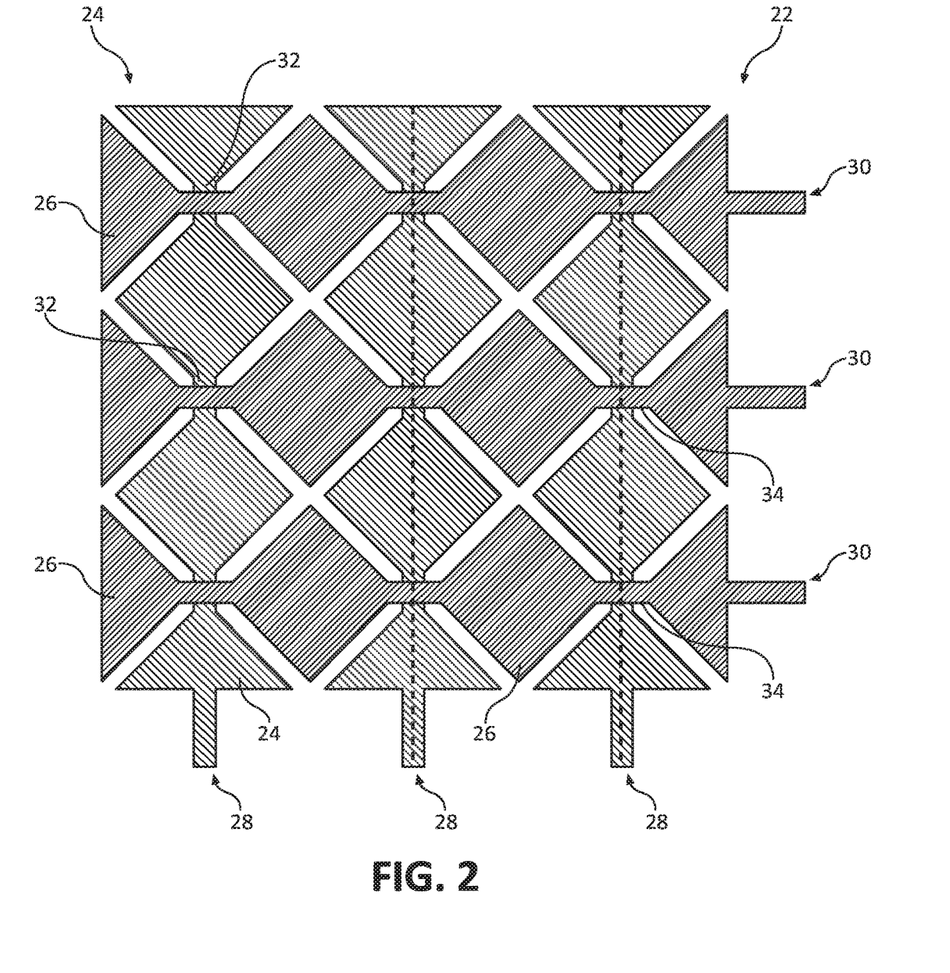
FIG. 2 is a plan view of an embodiment of a touch sensor array.
Figure 9:
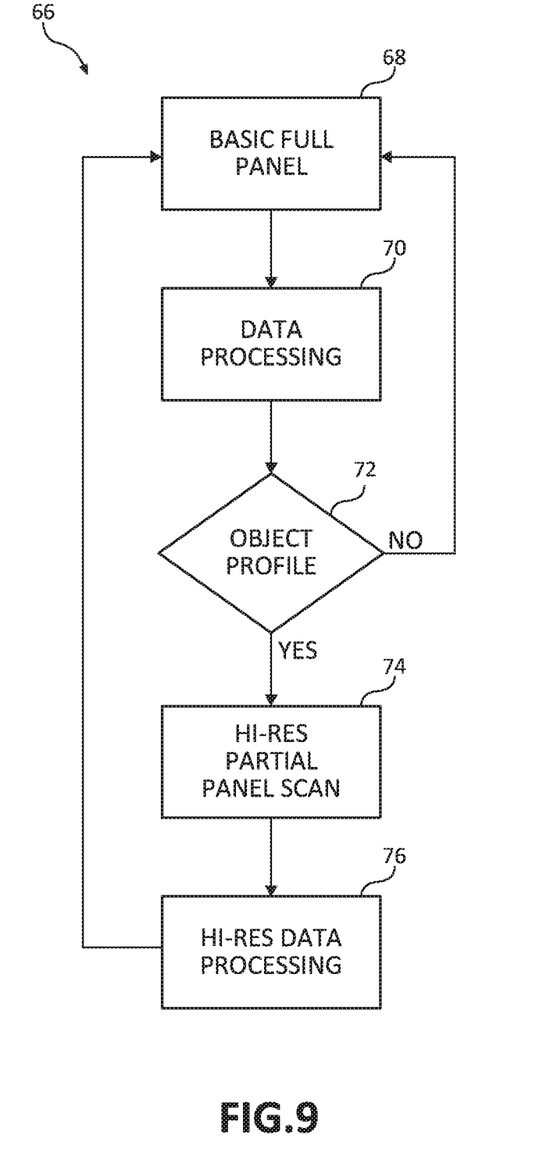
FIG. 9 is a flow chart of a method for operating a capacitance sensing device according to an embodiment.

In one embodiment, the scanning of the sensor array 22 (FIG. 2) may be performed in multiple stages, or steps. An embodiment of such a method 66 is depicted in FIG. 9. The method 66 begins at step 68 with a basic (i.e., low resolution) scan being performed of the entire sensor array 22 (or a first portion of the sensor array 22). Data processing is performed at step 70 to determine if a suitable object (e.g., one with a capacitive profile such as described above) is in proximity with the sensor array 22. If no such object is detected, at step 72, the method 66 returns to step 66.

In one embodiment, the presence of a relatively large high capacitance portion with a particular shape (e.g., portion 38a in FIG. 3) may lead to a determination that an object with a capacitive profile has been detected. Is such an object is detected, the method 66 proceeds to step 74.

At step 74, a second scan of the sensor array 22 is performed. In one embodiment, the second scan is performed at a second, higher resolution than the first scan, which may allow for more complex capacitive profiles to be used. The second scan may also be performed on only a second portion of the sensor array 22. For example, with reference to FIG. 3, the first scan (step 68) may be performed over the entire sensor array 22 and/or the entire capacitive profile 36. However, the second scan (step 74) may be performed on only the portion of the sensor array 22 that corresponds to those portions of the capacitive profile 36 that include portions 38b (i.e., and not portion 38a). Thus, the second scan may be performed on a portion of the sensor array 22 which is smaller, and may overlap, the portion of the sensor array 22 scanned in the first scan.

At step 76, data processing (e.g., high resolution) is performed, which includes determining the data associated with the capacitive profile 36 and/or the object 14, as described above.

According to another aspect of the present invention, the sensor array 22 is used to exchange data with the object 14 via capacitive coupling. More particularly, the sensor array 22 may be used to communicate data encoded on a carrier signal via capacitance coupling between the sensor array and another device. In one embodiment, serial data may be communicated to the object and/or received from the object using as Universal Asynchronous Receiver/Transmitter (UART). In one implementation, the UART data may be modulated on a carrier; in another implementation, the UART data may be communicated directly.

In such an embodiment, a processing device or a controller coupled to the sensor array 22 may be configured to provide modulated signals to the sensor electrodes 24 and/or 26 such that the data (e.g., in the form of modulated signals) is transmitted from the sensor array 22. Likewise, the processing device may be configured to demodulate signals received from the sensor array 22 as caused by the electrodes 24 and/or 26 capacitatively coupling signals emitted from the object 14.

In one application, both the capacitance sensing device and the device it is communicating with may share a common electrical ground—for example, if the user is holding both devices. In this case, the touchscreen, for example, may be used to form a single plate of a single capacitor to communicate data via capacitatively coupled signals between the touchscreen device and another device. In another application, the two devices may be electrically isolated from each other (other than via the capacitative coupling), and in this case, a return signal path may be required. In one implementation, interleaved, alternating rows or columns of the touchscreen may be connected together to form a pair of capacitor plates and couple with a corresponding pair or set of plates on the other device. In such an embodiment, a differential signal may be transmitted via the pair of capacitors thus formed between the two devices.

Figure 10:
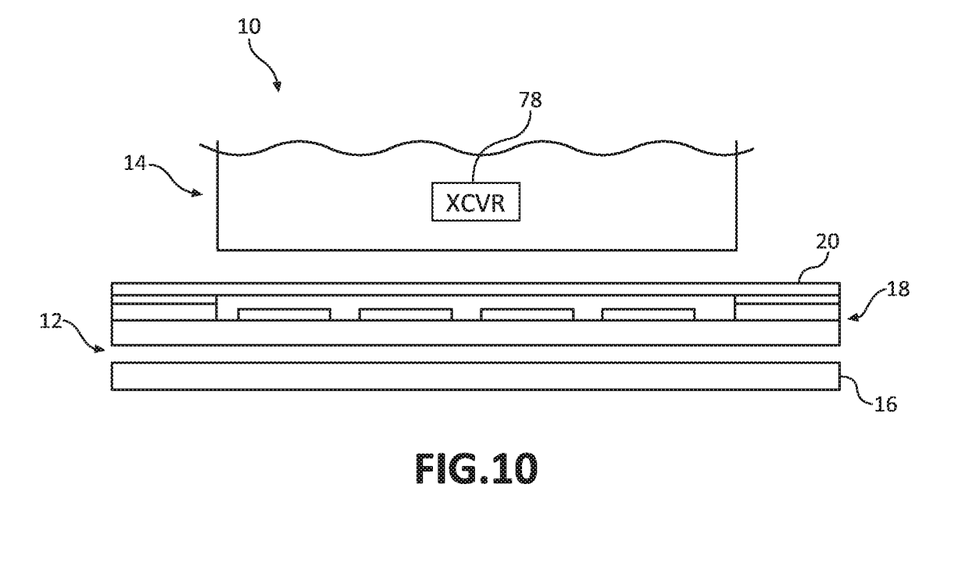
FIG. 10 is a simplified cross-sectional view of the touch sensor device system according to another embodiment

With reference now to FIG. 10, in such an embodiment, the object 14 within a system 10 otherwise similar to that shown in FIG. 1 may have a transceiver (XCVR) (or just a transmitter or just a receiver) 78 embedded therein. As such, the object 14 may be device configured for communication, and in some embodiments, the object 14 may even take the form of another capacitance sensing device (or a device that includes a capacitance sensing device).

Figure 11:
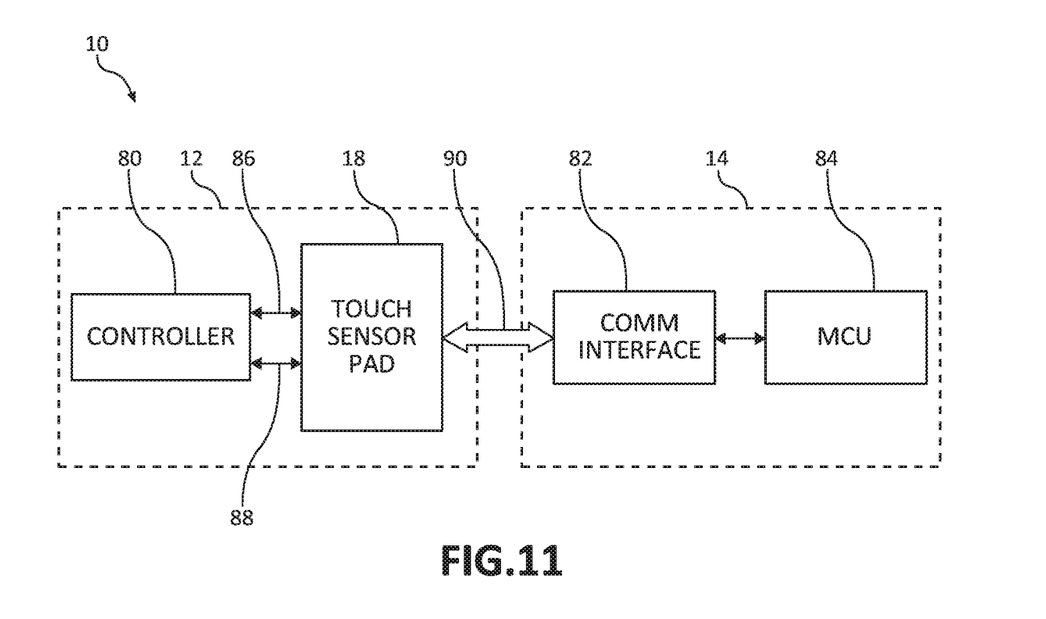
FIG. 11 is a simplified block diagram of the touch sensor device system of FIG. 10.

FIG. 11 is a simplified block diagram of a system similar to that shown in FIG. 10. As shown in FIG. 11, the capacitance sensing device 12 includes a touch sensor pad (e.g., the touch sensor assembly) 18 and a controller 80, while the object 14 includes a communications interface 82 and a microcontroller (MCU) 84 (e.g., including the XCVR). Within the capacitance sensing device 12, touch sensor signals 86 and communications signals 88 are sent between the touch sensor pad 18 and the controller 80. In one embodiment, the touch sensor signals 86 and the communications signals 88 are sent using the same physical connections. Within the object 14, communications signals 90 are sent between the MCU 84 and the communications interface 82. In one embodiment, the communications interface 82 may include one or more capacitors.

A device-object interface 90, through which the data described herein is sent, may be formed by the capacitance sensing device 12 and the object 14 being in contact or simply within close proximity (e.g., a few centimeters). More particularly, in one embodiment, the device-object interface 90 may include a capacitor that jointly is formed by the capacitance sensing device 12 and the object 14. This capacitor may include a first conductor (or plate) formed by the touch sensor pad 18, a second conductor formed by a conductive portion of the communications interface 82, and an insulating material between the first and second conductors formed by the overlay 20 (e.g., glass), air, and/or a housing of the capacitance sensing device 12.

Examples of the processes that could be implemented using the sensor array 22 in such a way include, but are not limited to, device authentication/password transfers, mobile payments, access control, electronic business card transfers, or other applications which may utilize near field communication (NFC).

In one application of this aspect of the invention, user identification information may be communicated in this way. In one particular embodiment, the touchscreen device (i.e., the capacitance sensing device) may be used in place of an radio-frequency identification (RFID) or NFC identification badge to authenticate a user to unlock a door or identify the user to some other access control system. The access control system may support multiple communication types including but not limited to RFID and NFC, so that the same access control receiver may be used to provide access to users of RFID cards, NFC-enabled devices, and other suitably configured touchscreen devices.

In another application, this aspect of the invention may be used to authenticate a wireless device attempting to join a wireless network such as but not limited to a Bluetooth, Wi-Fi, or Zigbee network.

In another application of this aspect of the invention, the touchscreen device may be used to identify the user of the touchscreen device to an automobile—for example to allow stored settings to be retrieved (e.g., controlling seat position, mirror angle, in-car entertainment system settings, etc.).

In another application, this aspect of the invention may be used to implement the communications channel of an "electronic wallet" in an equivalent way as is currently implemented using NFC for ePayment systems.

Utilizing the sensor array in such a manner may require the object and the scanning system of the capacitance sensing device 12 to work together, sharing the time-sensitive and critical resource of the sensor array 22. Several methods for sending data on the shared resource (i.e., the sensor array 22) without conflicts are described below.

A first method involves transmission to the hardware to occur while the processor is processing data from the previous scan. A second method involves a communication interface between the two modules. If the modules are on separate silicon, a physical interface may be needed. If all modules are collocated in a single chip, then each method simply has to block execution until critical resource use has been completed.

A third method involves the use of a capacitive profile, along with the transceiver 78, on the object 14 to signal the device 12 that the object 14 includes a transceiver. As such, in one embodiment, the detection of a particular capacitive profile initiates the wireless communication between the device 12 and the object 14.

Regardless of the method chosen for the device side module, the object may require intelligence when deciding when to scan. The object may glean information about scan rate, by observing multiple scans and timing between them. There may be a protocol regarding the time slice inside of the main loop execution available for the real world object to transmit without appearing to be a TX sensor line. Such protocols will be well known to those skilled in the art, and may include, but are not limited to RS232, RS485, Hayes Modem command protocols, etc.

Once an object can identify and communicate with a real world object an entire world of new user experiences may be enabled. The ability of the objects to communicate allows for a host to create haptics interactions outside the actual frame of the device. For example, a real-world gamepiece may vibrate when certain game conditions occur, or two devices could synchronize for precision timing of events. When meeting a new business contact, a user may transmit a business card, and receive the business card of the contact, by simply touching cell phones together.

The capacitive profile method presented here is used because that is the current best-in-class technology for touchscreen sensing. However, the same idea of sensed profiles and serial communication may apply to any sensing method, using any conductive material. The profile and communication theory may extend to non-conductive sensing methods as well. If the sensing method instead used images to detect objects, this could be modified using, for example, LED's to enable a communication channel between real world objects and the controller.

In other embodiments, different materials may be used to form the electrodes, such as copper, aluminum, silver, or any suitable conductive material that may be appropriately patterned. Furthermore, an FPC may be used to form the electrodes. In such an embodiment, the various conductive layers in the FPC may be appropriately configured to form the array of electrodes as described above, as well as to form the primary traces. As such, it should be understood that the electrodes, the traces, and the insulating material (or body) may all be formed by a single, appropriately configured FPC. As will be appreciated by one skilled in the art, such embodiments may be particularly applicable to non-transparent devices, such as mouse pads, track pads, touch pads, etc. Additionally, in other embodiments, the substrate may be made of other materials, such as any suitable plastic, including vinyl and polyamide, which may not be transparent, depending on the particular device.

In another embodiment, the sensor may be formed by bonding a glass (or other transparent insulating) lens onto another glass with the sensor pattern disposed on. In yet another embodiment, the sensor may be formed by bonding glass (or other transparent insulating material) onto a sheet of PET containing the sensor pattern.

Figure 12:
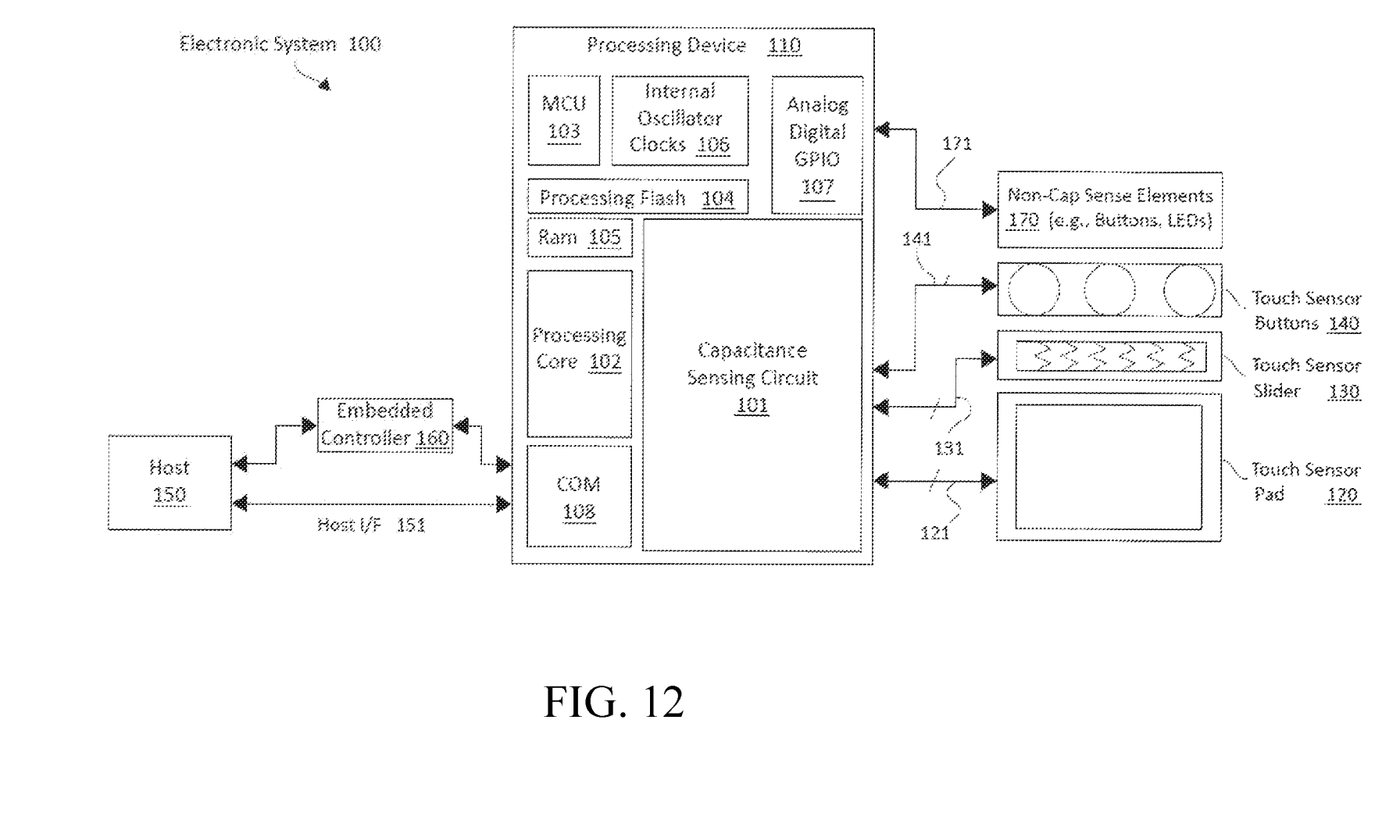
FIG. 12 is a block diagram illustrating an embodiment of an electronic system.

FIG. 12 illustrates a block diagram of one embodiment of an electronic system having a processing device for detecting a presence of a conductive object, and performing the other methods and processes described above, according to an embodiment of the present invention. The electronic system 100 includes a processing device 110, a touch-sensor pad 120, a touch-sensor slider 130, touch-sensor buttons 140, a host processor 150, an embedded controller 160, and non-capacitance sensor elements 170. The processing device 110 may include analog and/or digital general purpose input/output ("GPIO") ports 107. The GPIO ports 107 may be programmable and may be coupled to a Programmable Interconnect and Logic ("PIL"), which acts as an interconnect between the GPIO ports 107 and a digital block array of the processing device 110. The processing device 110 may also include memory, such as random access memory ("RAM") 105 and program flash 104. The RAM 105 may be static RAM ("SRAM"), and the program flash 104 may be a non-volatile storage, which may be used to store firmware (e.g., control algorithms executable by processing core 102 to implement operations described herein). The processing device 110 may also include a memory controller unit ("MCU") 103 coupled to memory and the processing core 102.

The processing device 110 may also include one or more analog blocks array coupled to the system bus. The analog blocks array also may be configured to implement a variety of analog circuits (e.g., ADCs, DACs, analog filters, etc.). The analog block array may also be coupled to the GPIO 107.

As illustrated, the capacitance sensing circuit 101 may be integrated into the processing device 110. The capacitance sensing circuit 101 may include analog I/O for coupling to an external component, such as the touch-sensor pad 120, the touch-sensor slider 130, the touch-sensor buttons 140, and/or other devices. The capacitance sensing circuit 101 and the processing device 110 are described in more detail below.

The embodiments described herein are not limited to touch-sensor pads for notebook implementations, but can be used in other capacitive sensing implementations, for example, the sensing device may be a touchscreen (or touch screen), a touch-sensor slider 130, or touch-sensor buttons 140 (e.g., capacitance sensing buttons). In one embodiment, these sensing devices may include one or more capacitive sensors. The operations described herein are not limited to tablet computers, smartphones, touchscreen phone handsets, mobile internet devices (MIDs), GPS navigation devices, electronic books, notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 100 includes a touch-sensor pad 120 coupled to the processing device 110 via bus 121. The touch-sensor pad 120 may include a multi-dimension sensor array. The multi-dimension sensor array includes multiple sensor elements, organized as rows and columns, such as the sensor arrays described above and shown in, for example, FIG. 2. In another embodiment, the electronic system 100 includes a touch-sensor slider 130 coupled to the processing device 110 via bus 131. The touch-sensor slider 130 may include a single-dimension sensor array. The single-dimension sensor array includes multiple sensor elements, organized as rows, or alternatively, as columns. In another embodiment, the electronic system 100 includes touch-sensor buttons 140 coupled to the processing device 110 via bus 141. The touch-sensor buttons 140 may include a single-dimension or multi-dimension sensor array. The single- or multi-dimension sensor array may include multiple sensor elements. For a touch-sensor button, the sensor elements may be coupled together to detect a presence of a conductive object over the entire surface of the sensing device. Alternatively, the touch-sensor buttons 140 may have a single sensor element to detect the presence of the conductive object. In one embodiment, the touch-sensor buttons 140 may include a capacitive sensor element. The capacitive sensor elements may be used as non-contact sensor elements. These sensor elements, when protected by an insulating layer, offer resistance to severe environments.

The electronic system 100 may include any combination of one or more of the touch-sensor pad 120, the touch-sensor slider 130, and/or the touch-sensor button 140. In another embodiment, the electronic system 100 may also include non-capacitance sensor elements 170 coupled to the processing device 110 via bus 171. The non-capacitance sensor elements 170 may include buttons, light emitting diodes ("LEDs"), and other user interface devices, such as a mouse, a keyboard, or other functional keys that do not require capacitance sensing. In one embodiment, buses 171, 141, 131, and 121 may be a single bus. Alternatively, these buses may be configured into any combination of one or more separate buses.

The processing device 110 may include internal oscillator/clocks 106 and a communication block ("COM") 108. The oscillator/clocks 106 provides clock signals to one or more of the components of the processing device 110. The communication block 108 may be used to communicate with an external component, such as a host processor (or host) 150, via host interface ("I/F") line 151, using signaling protocols such as, but not limited to I2C, SPI or USB. Alternatively, the processing block 110 may also be coupled to embedded controller 160 to communicate with the external components, such as host 150. In one embodiment, the processing device 110 is configured to communicate with the embedded controller 160 or the host 150 to send and/or receive data.

The processing device 110 may reside on a common carrier substrate such as, for example, an integrated circuit ("IC") die substrate, a multi-chip module substrate, or the like. Alternatively, the components of the processing device 110 may be one or more separate integrated circuits and/or discrete components. In one exemplary embodiment, the processing device 110 may be a Programmable System on a Chip ("PSoC™") processing device, manufactured by Cypress Semiconductor Corporation, San Jose, Calif. Alternatively, the processing device 110 may be one or more other processing devices known by those of ordinary skill in the art, such as a microcontroller, a microprocessor or central processing unit, a controller, a special-purpose processor, a digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 110 may also be done in the host.

The capacitance sensing circuit 101 may be integrated into the IC of the processing device 110, or alternatively, in a separate IC. Alternatively, descriptions of the capacitance sensing circuit 101 may be generated and compiled for incorporation into other integrated circuits. For example, behavioral level code describing the capacitance sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensing circuit 101.

It should be noted that the components of the electronic system 100 may include all the components described above. Alternatively, the electronic system 100 may include only some of the components described above.

In one embodiment, the electronic system 100 may be used in a notebook computer. Alternatively, the electronic system 100 may be used in other applications, such as a mobile handset, a personal data assistant ("PDA"), a keyboard, a television, a remote control, a monitor, a handheld multi-media device, a handheld video player, a handheld gaming device, or a control panel.

The conductive object in this case is a finger, alternatively, this technique may be applied to any conductive object, for example, a conductive door switch, position sensor, or conductive pen in a stylus tracking system.

Although the foregoing examples have been described in some detail for purposes of clarity of understanding, the invention is not limited to the details provided. There are many alternative ways of implementing the invention. The disclosed examples are illustrative and not restrictive.

Thus, in one embodiment, a method for operating a capacitance sensing device is provided. A capacitive profile of an object proximate to the capacitance sensing device is detected. The capacitive profile includes first capacitance portions and second capacitance portions. At least one of the second capacitance portions is between two of the first capacitance portions. A capacitance value of the first capacitance portions is greater than a capacitance value of the second capacitance portions. Data associated with the object is determined based on the capacitive profile of the object.

In another embodiment, a capacitance sensing device is provided. The capacitance sensing device includes an array of capacitive sensor elements and a processing device coupled to the array of capacitive sensor elements. The processing device is configured to detect a capacitive profile of an object proximate to the array of capacitive sensor elements. The capacitive profile includes first capacitance portions and second capacitance portions. At least one of the second capacitance portions is between two of the first capacitance portions. A capacitance value of the first capacitance portions is greater than a capacitance value of the second capacitance portions. The processing device is also configured to determine data associated with the object based on the capacitive profile of the object.

In a further embodiment, a capacitance sensing device is provided. The capacitance sensing device includes an array of capacitive sensor elements and a controller coupled to the array of a capacitive sensor elements. The controller is configured to detect a capacitive profile of an object proximate to the array of capacitive sensor elements. The capacitive profile includes first capacitance portions and second capacitance portions. At least one of the second capacitance portions is between two of the first capacitance portions. A capacitance value of the first capacitance portions is greater than a capacitance value of the second capacitance portions. The controller is also configured to determine data associated with the object based on the capacitive profile of the object. The controller is further configured to at least one of provide signals to the array of capacitive sensor elements such that the array of capacitive sensor elements transmit modulated signals and demodulate modulated signals received from the array of capacitive sensor elements.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method of transferring data between a first device and a second device, the method comprising:
   generating, using an output circuit, an analog signal based on a data signal for an application associated with the first device and the second device; and
   transmitting the data signal over an interface between a processor of the first device and a processor of the second device, the transmitting of the data signal over the interface comprising capacitively coupling the analog signal through a capacitor formed by at least one sensor electrode, of a touchscreen, of the first device and a conductor of the second device.

2. The method of claim 1, wherein the generating of the analog signal using the output circuit includes using an output circuit of the first device and the transmitting of the data signal includes transmitting the data signal from the processor of the first device to the processor of the second device.

3. The method of claim 1, wherein the generating of the analog signal using the output circuit includes using an output circuit of the second device and the transmitting of the data signal includes transmitting the data signal from the processor of the second device to the processor of the first device.

4. The method of claim 1, wherein the application associated with the first device and the second device is selected from the group of applications consisting of, a device authentication application, a user identification application, a mobile payments application, an access control application, and an electronic business information transfer application.

5. The method of claim 1, wherein the generating, using the output circuit, the analog signal based on the data signal includes generating a modulated analog signal to represent the data signal.

6. The method of claim 1, further comprising:
receiving another data signal over the interface between the processor of the first device and the processor of the second device, the receiving of the other data signal over the interface comprising capacitively coupling another analog signal through the capacitor formed by the at least one of the sensor electrodes of the first device and the conductor of the second device; and
generating, using an input circuit, the other data signal based on the other analog signal.

7. The method of claim 6, wherein the generating, using the input circuit, the other data signal based on the other analog signal includes demodulating the other analog signal.

8. The method of claim 6, wherein the transmitting of the data over the interface and the receiving of the other data over the interface includes transmitting and receiving Universal Asynchronous Receiver/Transmitter (UART) serial data.

9. The method of claim 1, further comprising, using the processor of the first device, detecting that a conductive object is proximate to the at least one sensor electrode based on a capacitance of the at least one sensor electrode.

10. The method of claim 1, wherein the capacitively coupling the analog signal through the capacitor formed by the at least one sensor electrode of the first device and the conductor of the second device comprises capacitively coupling the analog signal through at least one capacitive sensor electrode, of a multi-dimensional array of capacitive sensor electrodes of a touchscreen.

11. An electronic system to transmit data, the electronic system comprising:
a memory configured to store software data;
at least one processor coupled to the memory;
input/output (I/O) circuitry coupled to the at least one processor; and
a plurality of capacitance sensing electrodes coupled to I/O circuitry, wherein the I/O circuitry is configured to provide an analog signal that is based on software data to at least one capacitance sensing electrode of the plurality of capacitance sensing electrodes, wherein the at least one capacitance sensing electrode is configured transmit the software data to another device through one or more capacitors to be formed by the at least one capacitance sensing electrode and the other device.

12. The electronic system of claim 11, wherein the I/O circuit is configured to generate a modulated analog signal including the software data and provide the modulated analog signal to the at least one capacitance sensing electrode.

13. The electronic system of claim 11, wherein the I/O circuitry is configured to provide other software data that is based on another analog signal to the processor, wherein the at least one capacitance sensing electrode is configured to receive the another analog signal through the one or more capacitors to be formed by the at least one capacitance sensing electrode and the other device.

14. The electronic system of claim 13, wherein the I/O circuitry is configured to demodulate the other analog signal and use the demodulated other analog signal to provide the other software data.

15. The electronic system of claim 13, wherein at least one of the software data and the other software data are associated with an application selected from the group of applications consisting of, a device authentication application, a user identification application, a mobile payments application, an access control application, and an electronic business information transfer application.

16. The electronic system of claim 11, wherein the I/O circuitry includes at least one of a Universal Asynchronous Receiver/Transmitter (UART), an analog to digital converter, a digital to analog converter, and a pulse width modulation circuit.

17. The electronic system of claim 11, wherein the at least one processor is further configured to detect that a conductive object is proximate to the at least one capacitance sensing electrode based on a capacitance of the at least one capacitance sensing electrode.

18. A method of transferring digital data by a capacitance sensing device, the method comprising:
detecting a presence of a communication device based on a capacitance of a capacitance sensor of the capacitance sensing device; and
responsive to detecting the presence of the communication device, transferring the digital data to the communication device, the transferring of the digital data comprising capacitively coupling an analog signal through a capacitor formed by the capacitance sensor and the communication device.

19. The method of claim 18, wherein detecting the presence of the communication device comprises identifying the communication device based on a capacitive profile of the communication device.

20. The method of claim 18, further comprising generating the analog signal based on the digital data, wherein the digital data includes at least one of device authentication information, user identification information, payment information, access information, media data information.

* * * * *